Figure 1:
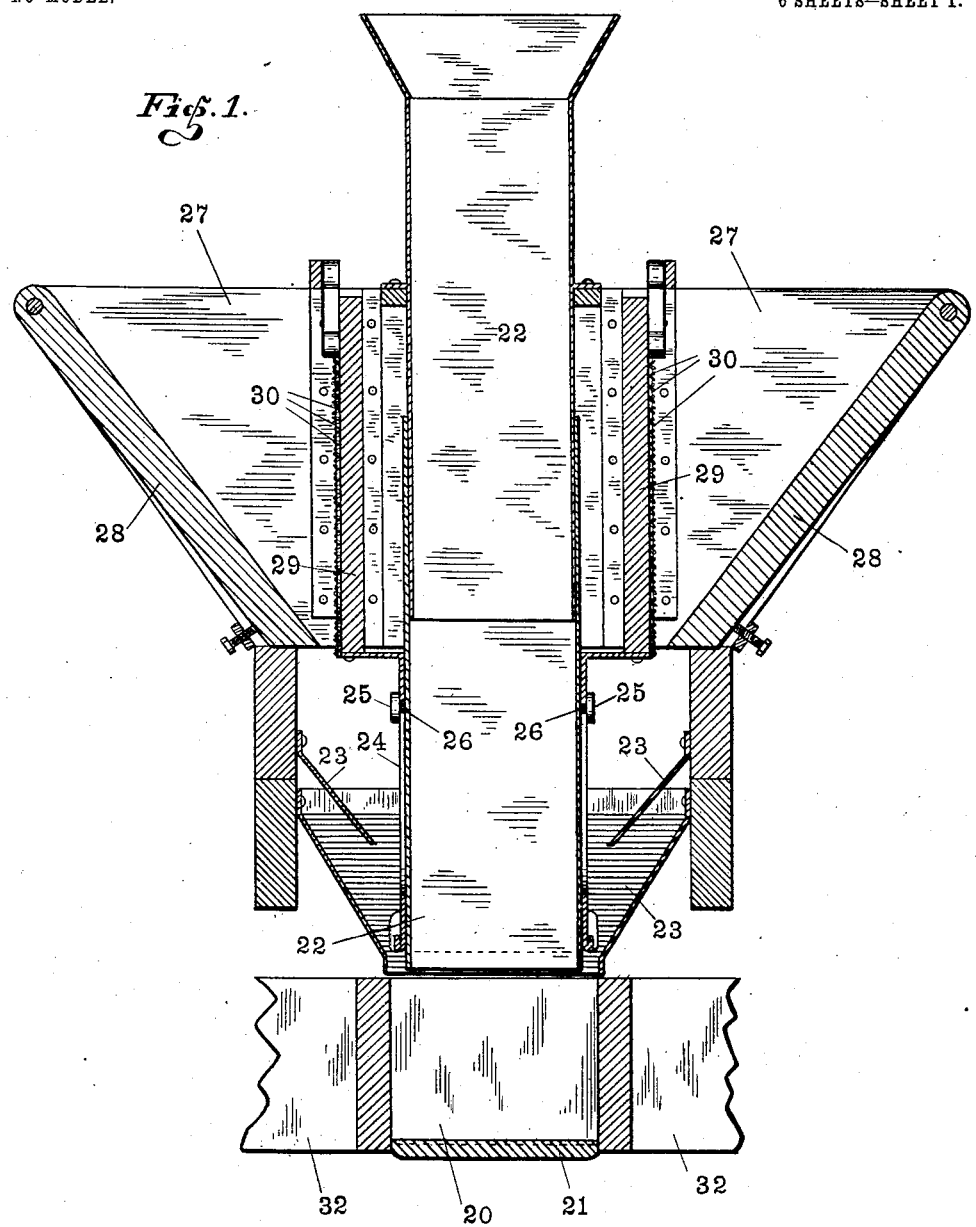

No. 762,007. PATENTED JUNE 7, 1904.
O. STALEY & J. A. JOHNSON.
CEMENT BRICK MAKING MACHINE.
APPLICATION FILED FEB. 27, 1904.
NO MODEL. 6 SHEETS—SHEET 1.

Witnesses
Adelaide Kearns
J. A. Walsh

Inventors
Ora Staley
John A. Johnson
By Bradford Hood
Attorneys

No. 762,007. PATENTED JUNE 7, 1904.
O. STALEY & J. A. JOHNSON.
CEMENT BRICK MAKING MACHINE.
APPLICATION FILED FEB. 27, 1904.
NO MODEL. 6 SHEETS—SHEET 4.

Witnesses
Adelaide Kearns
J. A. Walsh

Inventors
Ora Staley
John A. Johnson
By Bradford Hood
Attorneys

No. 762,007. PATENTED JUNE 7, 1904.
O. STALEY & J. A. JOHNSON.
CEMENT BRICK MAKING MACHINE.
APPLICATION FILED FEB. 27, 1904.
NO MODEL. 6 SHEETS—SHEET 5.

Witnesses
Adelaide Kearns
J. A. Walsh

Inventors
Ora Staley
John A. Johnson
By
Bradford & Hood
Attorneys

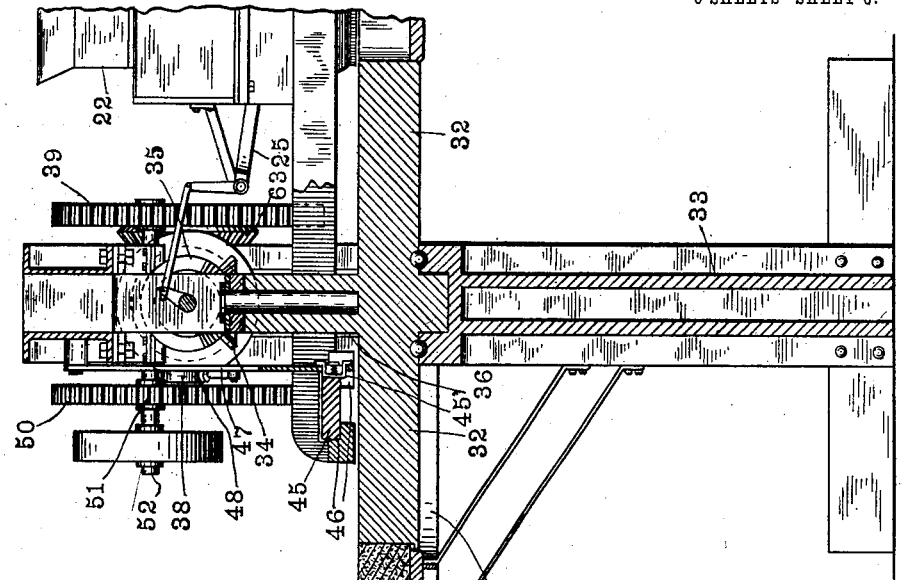

No. 762,007.

Patented June 7, 1904.

UNITED STATES PATENT OFFICE.

ORA STALEY, OF CHARLOTTESVILLE, AND JOHN A. JOHNSON, OF GREENFIELD, INDIANA.

CEMENT-BRICK-MAKING MACHINE.

SPECIFICATION forming part of Letters Patent No. 762,007, dated June 7, 1904.

Application filed February 27, 1904. Serial No. 195,521. (No model.)

*To all whom it may concern:*

Be it known that we, ORA STALEY, residing at Charlottesville, and JOHN A. JOHNSON, residing at Greenfield, in the county of Hancock and State of Indiana, citizens of the United States, have invented certain new and useful Improvements in Cement-Brick-Making Machines, of which the following is a specification.

It has heretofore been proposed to make bricks or building-stones from a plastic material—such, for instance, as hydraulic cement; but the commercial use thereof has been prevented by reason of the fact that, so far as we are aware, such bricks have been made of a uniform composition which in order to be of such quality as to produce a proper external face had to be made of so large a percentage of cement as to make its cost practically prohibitive. It has also been proposed in order to obviate this difficuly to make a brick which consisted of a core of coarser or less rich material which after being formed and partially set, so that it could be handled, was provided with a veneer of finer material; but experience has shown that bricks made in this way when subjected to pressure are likely to split at the line between the central core and the richer veneer. The expense of manufacture is also prohibitive.

The object of our invention is to produce mechanism by which a central core of one composition and an external facing or veneer of a different composition or degree of richness may be assembled substantially simultaneously and in such manner that the entire mass after assemblage may be subjected to such amount of pressure as to thoroughly agglomerate the two parts at a time when the mass is still green so that the veneer becomes thoroughly associated with the adjacent core and sets with it simultaneously, so that there can be no distinct line of union.

To this end our invention consists, fundamentally, of a peculiar mold and associated parts, which in the present case we have taken as a center about which has been built a mechanism to facilitate the rapid production of successive bricks.

The accompanying drawings illustrate our invention.

Figure 2:
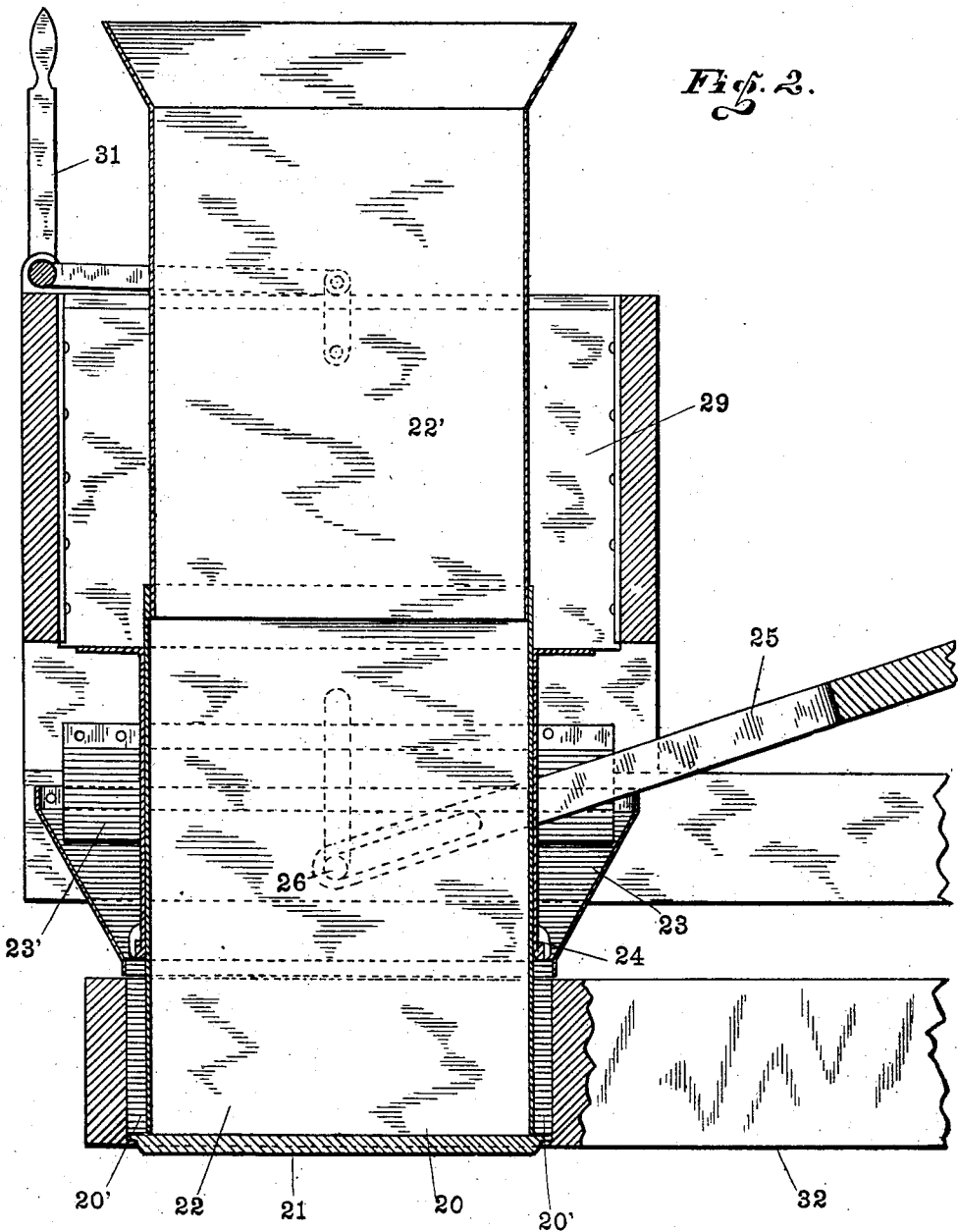
Figure 3:
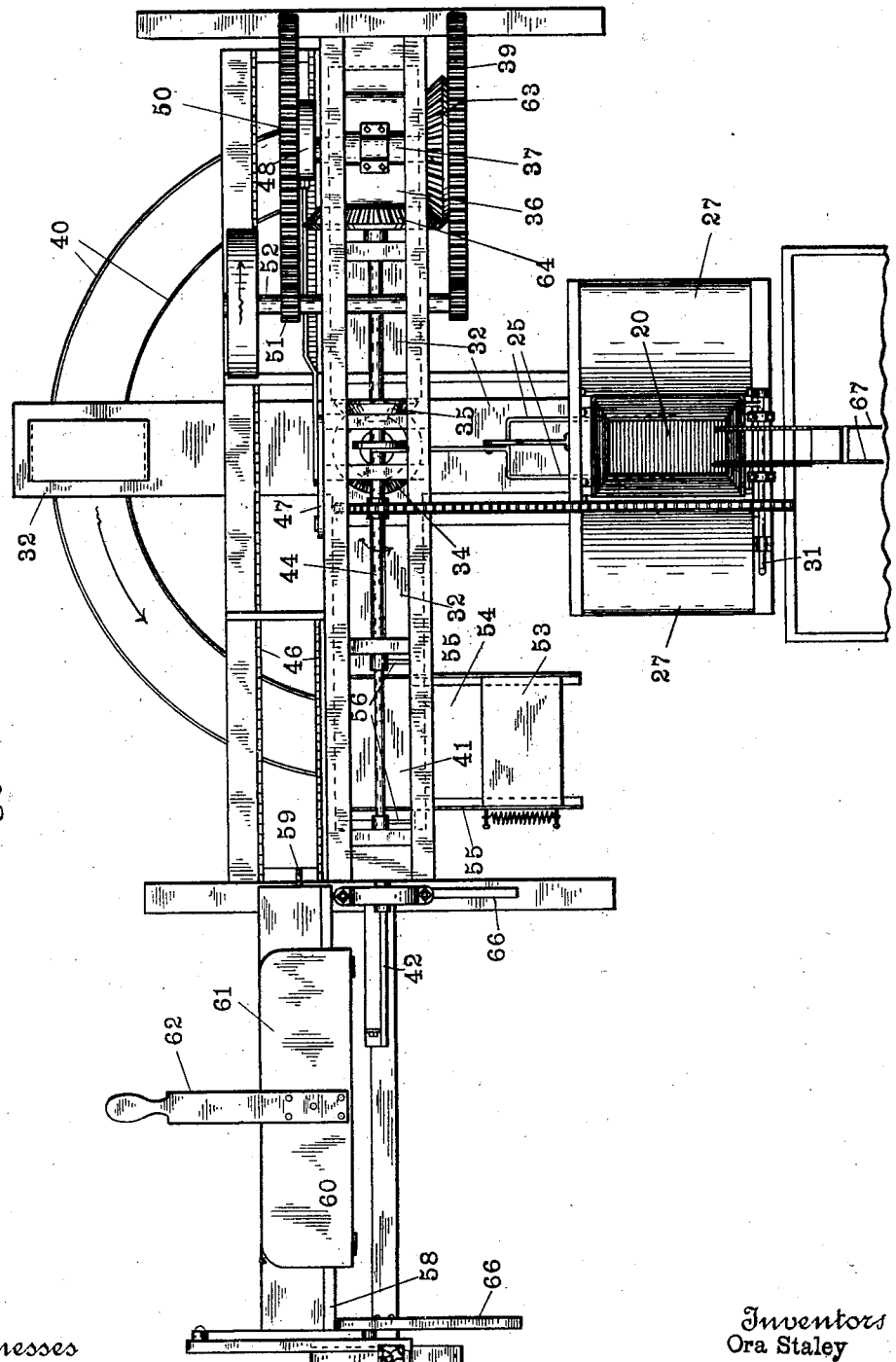
Figure 4:
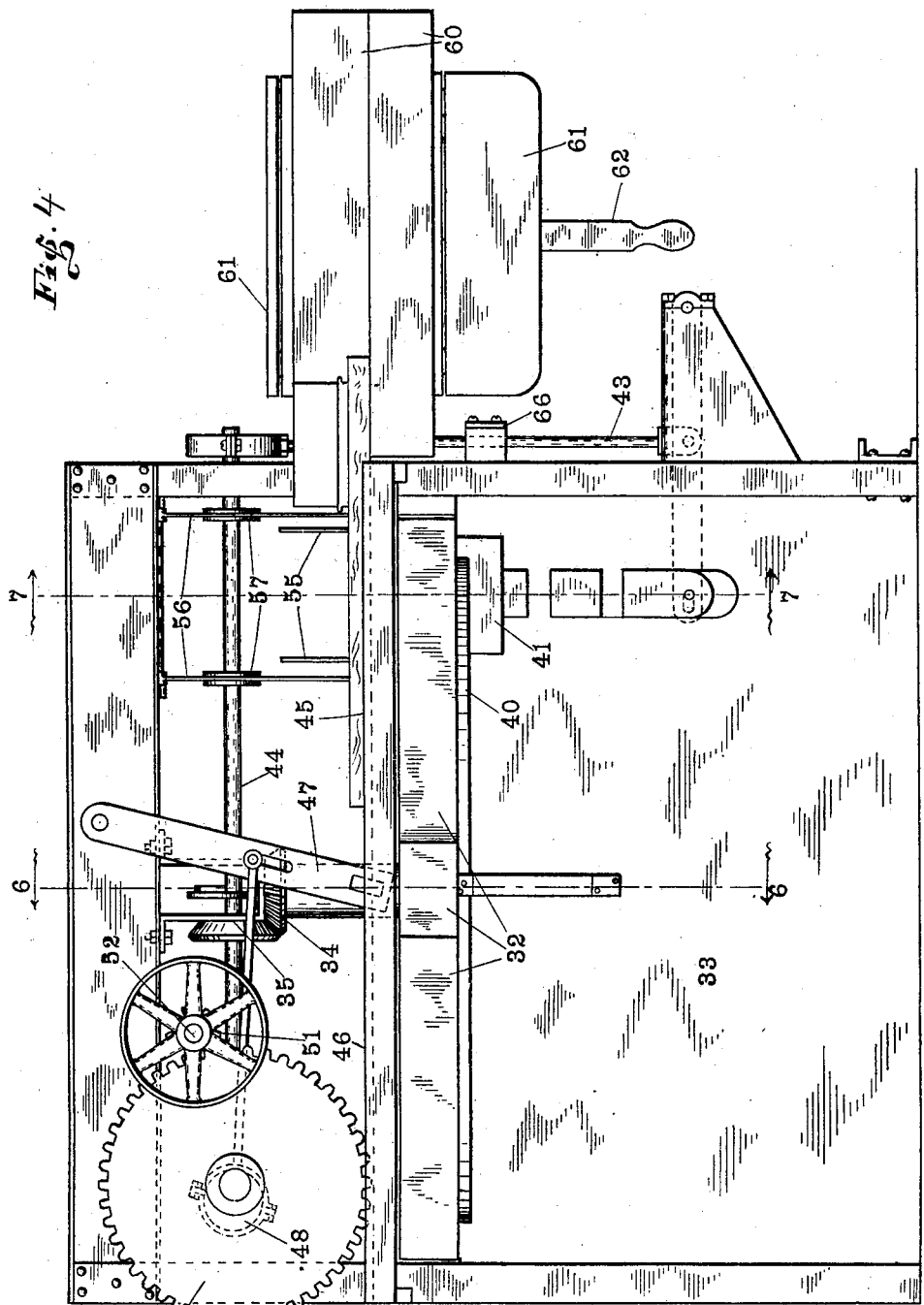
Figure 5:
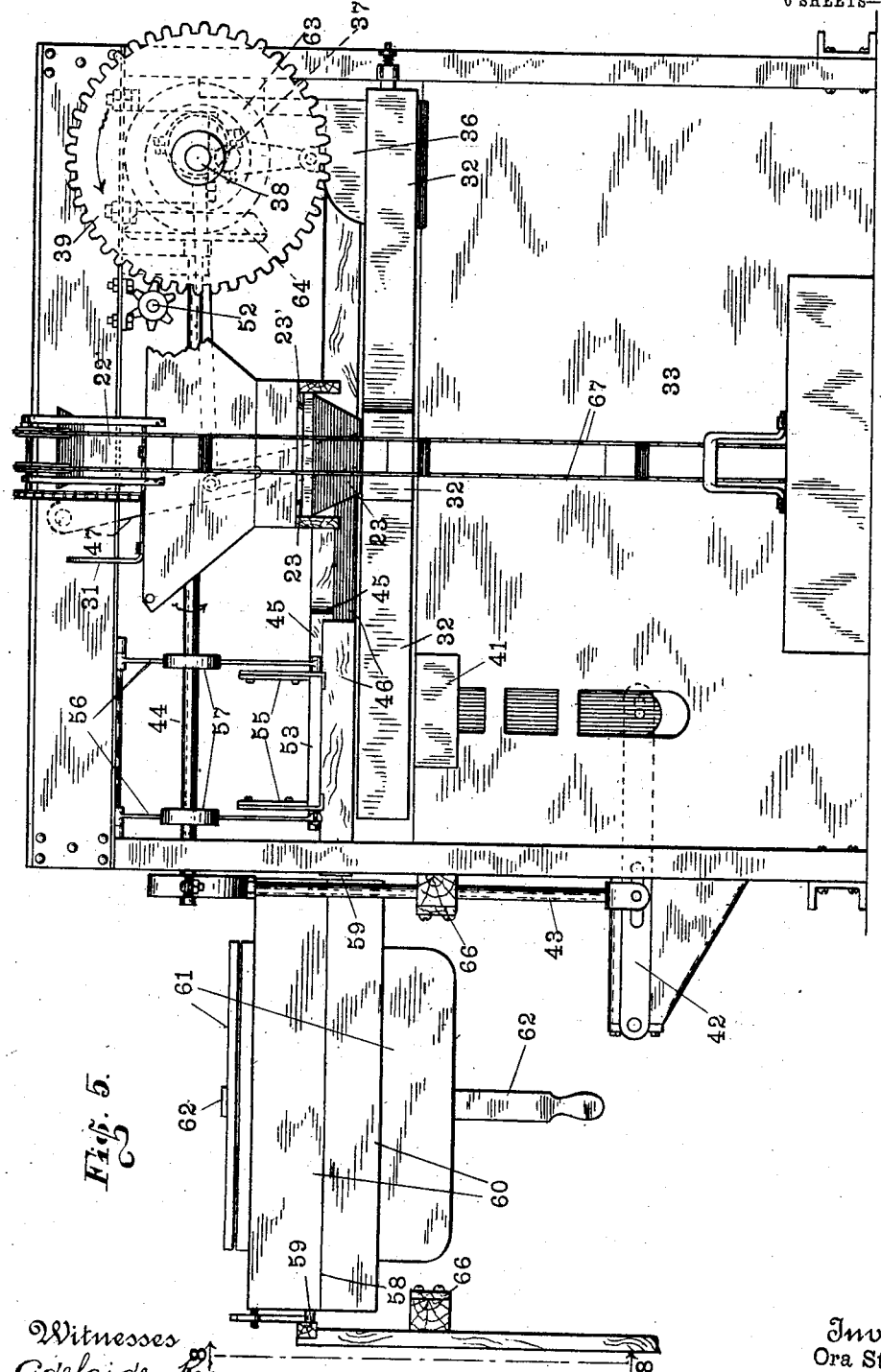

Figure 1 is a transverse section of the mold and means for introducing the different materials into the mold which form the fundamental feature of our invention. Fig. 2 is a section at right angles to Fig. 1. Fig. 3 is a plan of a machine for facilitating the rapid production of bricks by the mechanism shown in Figs. 1 and 2. Fig. 4 is a side elevation looking to the right in Fig. 3. Fig. 5 is an elevation of the side opposite to that shown in Fig. 4 looking to the left of Fig. 3. Fig. 6 is a section on line 6 6 of Fig. 4. Fig. 7 is a section on line 7 7 of Fig. 4, and Fig. 8 an elevation of the means for handling the finished brick looking in the direction of the arrows 8 8 in Fig. 5.

As previously stated, the essential and fundamental feature of our invention resides in the mechanism shown in Figs. 1 and 2 and consists, primarily, of a mold open at its top and of such cross-section as may be desired for the finished product. Associated with this mold is a core-box which is adapted to be projected into the mold and is of the form and size of the central core of the brick. Associated with these two, the external mold and the core-box, are means for facilitating the introduction of a core material into the core-box and means for introducing the veneer material into the mold outside of the core-box, together with means for withdrawing the core-box and thereafter thoroughly uniting the core and veneer while the compositions are still green.

In the drawings, 20 indicates the mold in which the brick is to be formed, and in the present case this mold is provided with a removable bottom 21. Arranged above mold 20 is a core-box 22, which is adapted to be projected into the mold, as shown in Fig. 2, said core-box being of such dimensions that some or all of its walls will lie some distance inside and away from the walls of the mold, this being the case on those faces where the veneer is to be applied in the finished work. For convenience in the present case we have shown a core-box of less diameter than the mold in both directions, so that the veneer will be applied to four faces of the brick. Arranged above the mold outside of the core-box 22 is a hopper 23, the lower end of which is of a size substantially equal to the size of the mold and serves to direct the veneering plastic into the mold around the core-box. In order to insure a smooth external face of veneer, we provide a hollow or annular tamper-sheel 24, which fits closely around the core-box 22 and is adapted to be projected into the veneer-receiving space 20' between the core-box and the walls of the mold. Any suitable means may be used for projecting the core-box into the mold and for withdrawing the same therefrom—as, for instance, a lever 25, connected by suitable pins 26 to the core-box. In order to properly introduce the veneering plastic into the annular space between the core-box and the mold through hopper 23, we mount above hopper 23 a pair of supply-hoppers 27 27, each provided with an adjustable wall 28, the lower end of which may be adjusted toward and from a feeder-plate 29, which feeder-plate is provided with a roughened surface 30. As many feeder-plates may be arranged around the core-box and chute 22', leading thereto, as may be desired, in the present case two of such plates oppositely arranged being provided. These plates are arranged to be reciprocated vertically past the lower ends of the sides 28 by means of a lever 31. Plates 30 are connected at their lower ends to the tamper-cylinder 24, so that said tamper is reciprocated when the feeder-plates are reciprocated. Interposed between the lower ends of walls 28 and hopper 23 is a pair of oppositely-arranged plates 23', each of which lies above and parallel with one side of hopper 23 and projects over the adjacent sides of said hopper, so that a plastic dripping from the ends of walls 28 will be distributed by plates 23' the entire length of one side of hopper 23 and also upon the two adjacent sides, thus serving to distribute the plastic in all four sides of the mold, although fed from only two sides.

The operation of so much of the device as has been described is as follows: A sufficient quantity of core-forming material—such, for instance, as a mixture of gravel or coarse sand, from fifteen to thirty per cent. of Portland cement, and water—is introduced by a feed-belt 67 through chute 22' into the core-box 22, which has been projected into the mold 20, as shown in Fig. 2. At the same time a large quantity of plastic veneering material—such, for instance, as a mixture of fine sharp sand, Portland cement, and water in such proportions as to make a smooth surface when hardened—is placed in hoppers 27. An operation of lever 31 causes a reciprocation of the feeder 29, the roughened faces 30 of which operates to draw limited quantities of veneering plastic through the bottom of the hoppers, the same flowing over plates 23' through hopper 23 into the annular space between the core-box and the mold, the tamper 24 serving to tamp this material into said annular space, and this operation is continued until the mold is sufficiently filled. Thereupon core-box 22 may be withdrawn by lever 25, and the core material settles, so as to fill the space occupied by the core-box, which is comparatively thin. Any suitable means may be provided to compress the brick thus formed in order to insure proper connection between the core and veneer, and we have provided an effective means in connection with the appatus, which we will now proceed to describe.

In the remaining figures of the drawings we have shown a machine capable of producing bricks of the character described in rapid succession. This machine consists of a main body or rotatable platform, which in the drawings is shown as consisting of a plurality of radiating arms 32, in each of which is formed a mold 20, and this body is supported upon a suitable central standard 33. The main platform is provided with the gear 34, a mutilated gear 35 meshing therewith, so as to rotate the same. The hopper and feeding mechanism (shown in Figs. 1 and 2) is arranged so that by rotating the main platform the molds 20 may be successively brought thereunder. Arranged above the path of movement of the molds at a point where it may register with one of said molds at a time when another of the molds registers with the feeding mechanism we arrange a press, which consists of a presser-foot 36, which may be reciprocated by a suitable crank connection 37, carried by a shaft 38, driven by gear 39. Arranged below the path of movement of the molds concentric with the axis of rotation thereof is a track 40, which supports the bottom 21 at the time a filled mold comes into conjunction with the presser-foot 36. Located at the forward end of track 40 is a plunger 41, above which the bottom 21 of a filled mold containing a compressed brick is brought at a time when one of the empty molds is being filled by the filling mechanism (Shown in Figs. 1 and 2.)

The plunger 41 will be reciprocated by any suitable timed means, such as link 42 and pitman 43, which pitman is connected to and operated by the shaft 44, which carries the gear 35. Plunger 41 is adapted to be projected through each mold 20 as said mold comes opposite the plunger and is raised to the position shown in dotted lines in Fig. 7, at which time the lower face of the bottom 21, which is lifted by the plunger, will lie immediately above the upper face of a receiving-board 45, arranged in suitable guides 46. Board 45 is of any desired length, in the present case being shown as a trifle greater than three brick lengths. A plurality of boards 45 is provided, each of said boards being provided on one edge with as many notches 45' as there will be number of bricks to be placed on the board, and the board is shifted longitudinally by means of a ratchet-arm 47, (see Figs. 4 and 6,) which ratchet-arm may be reciprocated by means of a pitman 48, suitably connected to shaft 38. Shaft 38 carries a gear 50, meshing with a gear 51, carried by the main drive-shaft 52. Any suitable means may be provided for reciprocating the ratchet-arm 47.

Arranged substantially in the plane of the top face of board 45 is a plunger 53, adapted to engage each bottom 21 when it is projected up by plunger 41 to force said bottom, together with the brick carried thereby, onto the receiving-board 45. Plunger 53 is provided with a slot or perforation 54, which normally registers with the lower end of a hopper 55. Hopper 55 is adapted to receive bottoms 21, which will successively drop into slot 54, plunger 53 being operated by any suitable means—such, for instance, as lever 56 and the timed cam 57, carried by shaft 44.

Track 46 leads to a receiving-turner, which consists, primarily, of a base 58, pivotally supported on a substantially horizontal axis 59. Extending from opposite edges and opposite sides of base 58 are two side bars 60, to the outer end of each of which is hinged a plate 61, provided with a handle 62.

The operation is as follows: A rotation of the main driving-shaft 52 rotates shaft 38, which by means of a gear 63, (shown in dotted lines in Fig. 5,) meshing with a gear 64, carried by shaft 44, rotates said shaft 44. The rotation of said shaft 44 brings the mutilated gear 35 into mesh with the gear 34, so as to rotate the forming-table one quarter-turn, so as to bring the new mold 20 beneath the hopper 23. While a brick is being formed in the new mold in the manner already described presser-foot 36 is brought down into the mold which lies therebeneath and compresses the brick which has already been formed in said mold. At the same time or at any convenient time plunger 41 is thrown up, so as to force the finished brick in the mold which lies opposite said plunger upward, the bottom 21 being carried therewith, and thereafter cams 57 operate to force plunger 53 into engagement with said bottom 21 and shift the bottom, together with the brick thereon, over onto the receiving-board 45, at the same time depositing a new bottom 21 onto the plunger 41, so that as said plunger recedes the new bottom 21 will be carried into the adjacent mold 20. Thereafter ratchet-arm 47 is moved so as to shift board 45 longitudinally toward the turning-platform 58. The operations described are repeated in succession, the arms 32 being brought successively into coöperation with the filling-hopper, the presser-foot, and the discharging mechanism. When a sufficient number of bricks have been deposited upon board 45, it will have been shifted onto platform 58, a new board being inserted behind the filled board in any suitable manner. The operator thereupon places a board 65 upon the newly-formed bricks and brings the adjacent hinged leaf 61 thereover, whereupon the turning-platform, together with the bricks supported thereon, may be turned until board 65 is laid upon supports 66, whereupon the leaf 61 may be swung away and board 45 and bottoms 21 removed from the finished bricks. With the form of turning-platform shown in Fig. 8 the turning of the platform through a half-revolution brings the duplicate part of the platform into receiving position, and the operations are continued in succession in the manner described.

By the mechanism described we have been able to produce rapidly and economically a cement brick the interior of which is made of a less expensive mixture, while the exterior of which, at least those faces which show in a completed structure, have been veneered with a mixture capable of producing a finished surface, the two mixtures, however, being associated at a time when both are green and under such conditions that there is a thorough union between the two, so that there is no clear line of demarcation which would make a splitting of the veneer probable.

We claim as our invention—

1. In an apparatus for producing bricks from plastic material, the combination, with a mold, of a core-box adapted to be projected thereinto and withdrawn therefrom, a hopper surrounding said core-box and leading into the mold, a pair of deflector-plates 23' extending across two sides of said hopper, a pair of hoppers arranged above said deflector-plates, a pair of feeding-plates one forming a side of each of said hoppers, and means for reciprocating said plates whereby a plastic may be fed from said hoppers to said deflector-plates.

2. In an apparatus for producing bricks from plastic material, a turning mechanism consisting of a horizontally-pivoted receiving-base, a hinged leaf carried by said base substantially parallel therewith at a distance therefrom, and supports arranged below the pivot of said base to receive the top board of a freshly-formed brick, whereby a freshly-formed brick may be inverted without direct handling.

3. In an apparatus for producing bricks from plastic material, the combination of a horizontally-rotatable mold-carrying platform and a plurality of molds carried thereby, of a core-box, means for projecting said core-box into and withdrawing it from the molds, a hopper surrounding said core-box, means for feeding a plastic into the core-box, means for feeding another plastic into the hopper surrounding the core-box, a presser-foot, means for reciprocating said presser-foot, a plunger, means for reciprocating said plunger, a second plunger arranged adjacent the first plunger, means for reciprocating said second plunger at right angles to the first plunger, a receiving-board arranged adjacent the second plunger, means for removing said board into position to receive successive bricks, and means for shifting the mold-carrying table whereby the molds may be brought successively into conjunction with the core-box and surrounding hopper, the presser-foot and the plunger, substantially as and for the purposes set forth.

4. In an apparatus for producing bricks from plastic material, the combination of a horizontally-rotatable mold-carrying platform and a plurality of molds carried thereby, of a core-box, means for projecting said core-box into and withdrawing it from the molds, a hopper surrounding said core-box, means for feeding a plastic into the core-box, means for feeding another plastic into the hopper surrounding the core-box, a presser-foot, means for reciprocating said presser-foot, a plunger, means for reciprocating said plunger, a second plunger arranged adjacent the first plunger, means for reciprocating said second plunger at right angles to the first plunger, a receiving-board arranged adjacent the second plunger, means for removing said board into position to receive successive bricks, means for shifting the mold-carrying table whereby the molds may be brought successively into conjunction with the core-box and surrounding hopper, the presser-foot and the plunger, a turner mechanism consisting of a horizontally-pivoted receiving-platform adapted to receive the brick-receiving boards, a hinged leaf carried by said platform substantially parallel therewith at a distance therefrom, and supports arranged below the pivot of said platform to receive the top board of a freshly-formed brick whereby a freshly-formed brick may be inverted without direct handling.

5. In an apparatus for producing bricks from plastic material, the combination with a mold, of a core-box adapted to be projected thereinto and withdrawn therefrom, means for introducing a plastic into the core-box, means for introducing a veneering plastic into the space between the core-box and mold and a tamper for tamping the veneer into the mold.

6. In an apparatus for producing bricks from plastic material, the combination with a mold, of a core-box adapted to be projected thereinto and withdrawn therefrom, a hopper leading into said mold around the core-box, a pair of plastic-receiving hoppers, and means for feeding plastic from said pair of hoppers into the first-mentioned hopper which surrounds the core-box.

In witness whereof we have hereunto set our hands and seals, at Greenfield, Indiana, this 13th day of February, A. D. 1904.

ORA STALEY. [L. S.]
    JOHN A. JOHNSON. [L. S.]

Witnesses:
 JOHN A. BARR,
 VINTON A. SMITH.